United States Patent
Ozawa

(10) Patent No.: US 8,909,995 B2
(45) Date of Patent: Dec. 9, 2014

(54) MICROCOMPUTER WITH WATCHDOG TIMER GENERATING INTERNAL AND EXTERNAL RESET SIGNALS

(75) Inventor: Kazumasa Ozawa, Tokyo (JP)

(73) Assignee: LAPIS Semiconductor Co., Ltd., Yokohoma (JP)

(*) Notice: Subject to any disclaimer, the term of this patent is extended or adjusted under 35 U.S.C. 154(b) by 827 days.

(21) Appl. No.: 11/197,403

(22) Filed: Aug. 5, 2005

(65) Prior Publication Data

US 2006/0053349 A1    Mar. 9, 2006

(30) Foreign Application Priority Data

Sep. 9, 2004    (JP) ................. 2004-262640

(51) Int. Cl.
*G06F 11/00*    (2006.01)
*G06F 11/07*    (2006.01)

(52) U.S. Cl.
CPC ................. *G06F 11/0757* (2013.01)
USPC ............................. 714/51; 714/55

(58) Field of Classification Search
USPC ...................................... 714/51, 55
See application file for complete search history.

(56) References Cited

U.S. PATENT DOCUMENTS

| | | | | |
|---|---|---|---|---|
| 5,233,613 A | * | 8/1993 | Allen et al. | 714/55 |
| 5,440,603 A | * | 8/1995 | Sugita | 377/20 |
| 6,067,627 A | * | 5/2000 | Reents | 713/324 |
| 6,145,103 A | * | 11/2000 | Typaldos et al. | 714/55 |

FOREIGN PATENT DOCUMENTS

| | | |
|---|---|---|
| JP | 62210521 A | 9/1987 |
| JP | 07141066 A | 2/1995 |
| JP | 07-019187 | 3/1995 |
| JP | 08069345 A | 3/1996 |
| JP | 08179857 A | 7/1996 |
| JP | 08185244 A | 7/1996 |
| JP | 2000020498 A | 1/2000 |

OTHER PUBLICATIONS

Japanese Office Action for Japanese Patent Application No. 2004-262640 issued Jun. 24, 2008 w/partial translation.
Japanese Office Action "Notice of Reason for Rejection" date of Mailing Jul. 21, 2009; Japanese Patent Application No. 2004-262640 with Partial English Translation.

* cited by examiner

*Primary Examiner* — Jigar Patel
(74) *Attorney, Agent, or Firm* — Studebaker & Brackett PC

(57) ABSTRACT

A microcomputer or microcontroller with a watchdog timer-counter also has an external reset signal generator. When the central processing unit of the microcomputer or microcontroller fails to execute its control program correctly, the watchdog timer-counter generates an internal reset signal for a first interval, resetting the central processing unit, and the external reset signal generator generates an external reset signal for a second interval, different from the first interval. The length of the second interval can be set to match the requirements of external peripheral devices to which the external reset signal is supplied.

12 Claims, 6 Drawing Sheets

FIG.4

| BINARY SWITCH | | | ASSERTION TIME |
|---|---|---|---|
| NO. 3 | NO. 2 | NO. 1 | |
| 0 | 0 | 0 | 0 |
| 0 | 0 | 1 | 10 |
| 0 | 1 | 0 | 20 |
| 0 | 1 | 1 | 30 |
| 1 | 0 | 0 | 40 |
| 1 | 0 | 1 | 50 |
| 1 | 1 | 0 | 60 |
| 1 | 1 | 1 | 70 |

US 8,909,995 B2

MICROCOMPUTER WITH WATCHDOG TIMER GENERATING INTERNAL AND EXTERNAL RESET SIGNALS

BACKGROUND OF THE INVENTION

1. Field of the Invention

The present invention relates to a microcomputer, more particularly to a microcomputer having a watchdog timer.

2. Description of the Related Art

The term 'microcomputer' as used herein refers to a large-scale integrated circuit including a central processing unit (CPU) and other circuitry. Microcomputers of this type are used in many control applications, and are often referred to as microcontrollers. A watchdog timer (WDT) is a circuit that detects so-called runaway conditions in which the CPU's control program is not executed correctly, and resets the microcomputer when a runaway is detected.

While the CPU's control program is executing correctly, the CPU executes an instruction to clear a WDT counter at intervals such that the WDT counter never overflows. If a runaway occurs, the instruction to clear the WDT counter will not be executed as necessary and the WDT counter will eventually overflow, generating a signal that resets the microcomputer to recover from the runaway condition.

The signal from the WDT generally resets only the internal operation of the microcomputer. Therefore, in a system comprising a microcomputer and external peripheral devices, when the microcomputer malfunctions, first the microcomputer is internally reset by the signal generated by the WDT overflow, and then, after the microcomputer has recommenced normal operation, the external peripheral devices are reset by signals sent by the control program from output ports of the microcomputer.

The external peripheral devices are thus reset after the microcomputer is released from the reset state, but this scheme requires both hardware and software. The hardware includes the output ports from which the reset signals are sent to the external peripheral devices, and a timer to measure the time interval for which the reset signals are asserted. The software includes instructions to supervise the timer, instructions to control the output ports, and various other instructions. Accordingly, while the external peripheral devices are being reset, managing the resetting process places no small load on the microcomputer.

Another scheme is described in, for example, Japanese Patent No. H07-19187 (in the lower right column on page 3 and FIG. 1). In this scheme, the reset signal output from the runaway detection circuit (watchdog timer) is sent both to internal circuits in the microcomputer and also to the outside through a reset output terminal, so that, for example, another microcomputer can be informed the occurrence of a runaway.

Since the internal reset signal in the microcomputer described in the above patent document is also output to the outside, it can be used to reset external peripheral devices directly. When this is done, however, the pulse width of the reset signal has sometimes proved inadequate to reset the external peripheral devices reliably.

SUMMARY OF THE INVENTION

An object of the present invention is to provide a microcomputer with hardware for generating an external reset signal of appropriate length when the microcomputer's central processing unit is reset.

Another object of the invention is to enable the pulse width of the external reset signal to be set independently of the pulse width of the internal reset signal that resets the central processing unit.

The invented microcomputer has a central processing unit that, when operating normally, repeatedly generates a clear signal. A watchdog timer-counter receives the clear signal from the central processing unit. If no clear signal is received for a predetermined length of time, the watchdog timer-counter asserts an overflow reset signal for a first interval, thereby resetting the central processing unit.

The invented microcomputer also has an external reset-signal generator that asserts an external reset signal responsive to assertion of the overflow reset signal. The external reset signal is asserted for a second interval differing from the first interval, preferably longer than the first interval. The external reset signal is output through a reset output terminal to, for example, an external peripheral device controlled by the microcomputer.

The second interval is preferably selectable by the central processing unit, or by input of an external signal from, for example, a manual switch.

The invention enables external reset signals of appropriate durations to be supplied to external peripheral devices connected to the microcomputer.

BRIEF DESCRIPTION OF THE DRAWINGS

In the attached drawings:

FIG. 4 is a table illustrating selection of the second interval according to input of external signals from three binary switches;

DETAILED DESCRIPTION OF THE INVENTION

Figure 1:
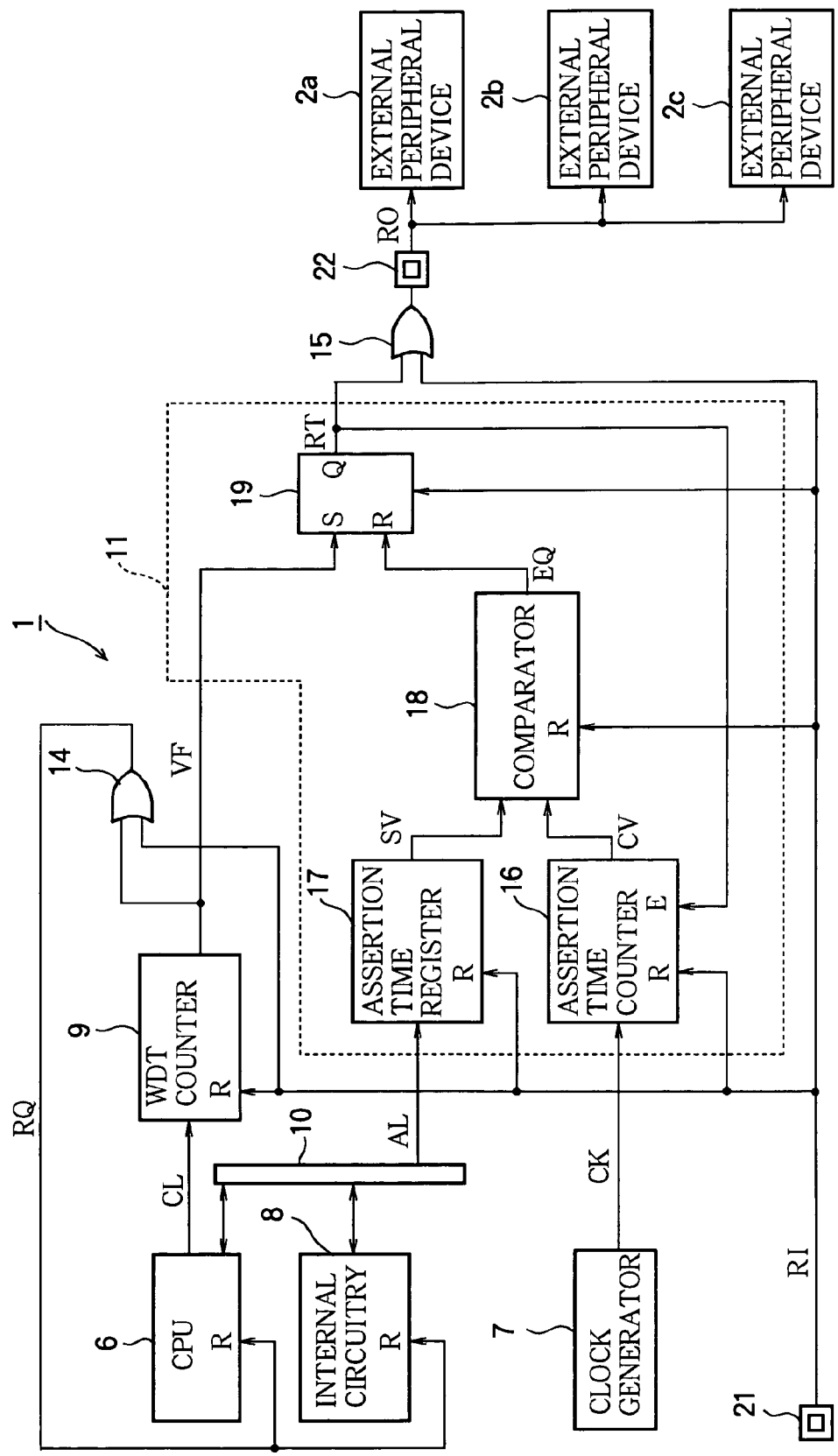
FIG. 1 is a schematic block diagram showing a microcomputer with external peripheral devices according to a first embodiment of the invention.

Embodiments of the invention will now be described with reference to the attached drawings, in which like elements are indicated by like reference characters.

First Embodiment

Referring to FIG. 1, the microcomputer 1 in the first embodiment is connected to various external peripheral devices 2a, 2b, 2c. The microcomputer 1 includes a CPU 6, a clock generator 7, other internal circuitry 8 such as memory and special-function registers, a watchdog timer-counter (WDT counter) 9, an internal bus 10, an external reset signal generator 11, a pair of logical OR gates 14, 15, a reset input terminal 21, and a reset output terminal 22.

The CPU 6 executes a control program stored in a memory. The memory may be part of the internal circuitry 8, or an external memory device (not shown). When executed correctly, the control program causes the CPU 6 to output a clear signal (CL) at intervals equal to or less than a predetermined time interval.

The clock generator 7 generates a clock signal (CK), referred to as a system clock, with which all operations in the microcomputer 1 are synchronized.

The watchdog timer-counter 9 counts up from an initial value of zero in synchronization with the system clock, and generates an overflow reset signal (VF) when its count reaches a predetermined value. The overflow reset signal (VF) is a pulse signal with a pulse width of, for example, two to eight system clock cycles. The watchdog timer-counter 9 has a reset input terminal R connected to the reset input terminal 21. The watchdog timer-counter 9 is reset to zero when the reset input (RI) signal received at this terminal is asserted, and does not operate while the reset input signal remains asserted. The watchdog timer-counter 9 also receives the clear (CL) signal from the CPU 6. Input of the clear signal clears the count in the watchdog timer-counter 9 to zero.

The internal bus 10 interconnects the CPU 6, the internal circuitry 8, and the external reset signal generator 11.

The first logical OR gate 14 performs a logical OR operation on the reset input (RI) signal and the overflow reset signal (VF), thereby generating an internal reset signal (RQ) by which the CPU 6 and internal circuitry 8 are reset.

Circuits that should not be rest by the WDT overflow reset signal (VF), such as, for example, the watchdog timer-counter 9 and external reset signal generator 11, are not reset by the internal reset signal (RQ), but are initialized separately when the reset input (RI) signal is input.

The external reset signal generator 11 receives the overflow reset signal (VF) and generates an external reset signal (RT) having a selectable assertion time that is normally longer than the assertion time of the overflow reset signal (VF). The external reset signal generator 11 comprises, for example, an assertion time counter 16, an assertion time register 17, a comparator 18, and a set-reset (RS) flip-flop 19 as shown in FIG. 1. The assertion time counter 16, comparator 18, and set-reset flip-flop 19 function as a pulse generating circuit that generates a pulse having a duration specified in the register 17, which functions as a settable data source.

The assertion time counter 16 starts counting the system clock (CK) when the overflow reset signal (VF) is generated. More precisely, the assertion time counter 16 receives the output of the set-reset flip-flop 19 at an enable input port (E) as a count enable signal, and counts only while the count enable signal is at the logical '1' or active level. When the count enable signal goes to the logical '0' or inactive level, the counting operation halts and the count is reset to its initial value (zero).

The assertion time register 17 stores data describing the length of the assertion time of the external reset signal, and is connected through the internal bus 10 to the CPU 6. The assertion length data are written into the assertion time register 17 via the internal bus 10 when the CPU 6 initializes the system after a reset. In the drawings, the assertion length data written by the CPU 6 are denoted AL and the value stored in and output from the assertion time register 17 is denoted SV.

The comparator 18 outputs an equality signal (EQ) when the count value (CV) output by the assertion time counter 16 matches stored value (SV) output from the assertion time register 17. More precisely, the comparator 18 sets the equality signal (EQ) to the logical '1' or active level when CV and SV are equal and to the logical '0' or inactive level they are unequal.

The set-reset flip-flop 19 is set by the overflow reset signal (VF) and reset by the equality signal (EQ). The output (RT) of the set-reset flip-flop 19 is supplied to the second logical OR gate 15 as the external reset signal and also to the assertion time counter 16 as the count enable signal.

As a result of these operations, the duration of the external reset signal (RT) corresponds to the assertion time stored in the assertion time register 17.

The comparator 18 and set-reset flip-flop 19 operate in synchronization with the system clock (CK), as do other circuits in the microcomputer 1. For simplicity, the signal lines by which the system clock is supplied to the comparator 18, set-reset flip-flop 19, and various other circuits are omitted from the drawings.

Because the assertion time counter 16 and set-reset flip-flop 19 both operate in synchronization with the system clock (CK), the assertion time counter 16 starts counting one clock cycle after the rise of the external reset (RT) signal. When the count value (CV) of the assertion time counter 16 matches the value (SV) set in the assertion time register 17, however, the output (RT) of the set-reset flip-flop 19 falls immediately. The value set in the assertion time register 17 should therefore be one less than the number of clock cycles constituting the desired assertion time of the external reset signal.

The second logical OR gate 15 performs a logical OR operation on the external reset signal (RT) and the reset input (RI) signal supplied from the reset input terminal 21, thereby generating a reset output (RO) signal, which is supplied through the reset output terminal 22 to the external peripheral devices 2a, 2b, 2c. The external peripheral devices 2a, 2b, 2c and the microcomputer 1 are also interconnected by signal lines (not shown) for transmitting and receiving data.

The reset input (RI) signal is generated, for example, when the power supply is turned on. Normally, the microcomputer 1 and the external peripheral devices 2a, 2b, 2c are initialized by this reset input (RI) signal, but they are also initialized when internal and external reset signals (RQ and RT) are generated from the overflow reset signal (VF).

As described above, the microcomputer 1 generates not only a signal (RQ) for resetting its own internal circuits but also a signal (RO) for resetting the external peripheral devices 2a, 2b, 2c.

The operation of the microcomputer will now be described with reference to FIG. 2.

When the system including the microcomputer 1 and external peripheral devices 2a, 2b, 2c is powered on, the reset input (RI) signal is input to the reset input terminal 21 of the microcomputer 1 from a reset signal generator (not shown).

This reset input (RI) signal propagates through the first logical OR gate 14 to activate the internal reset signal (RQ) and reset the CPU 6 and internal circuitry 8. The reset input (RI) signal is also supplied directly to the watchdog timer-counter 9, assertion time register 17, assertion time counter 16, comparator 18, and set-reset flip-flop 19 and resets all of them. In addition, the reset input (RI) signal propagates through the second logical OR gate 15 to activate the reset output (RO) signal and reset the external peripheral devices 2a, 2b, 2c.

The reset input (RI) signal is generated so as to have the necessary duration to reset all of the external peripheral devices 2a, 2b, 2c.

When the reset input (RI) signal is negated (t10), the system including the microcomputer 1 and external peripheral devices 2a, 2b, 2c begins normal operation. During the initial part of this normal operation, the control program running on the CPU 6 sets assertion time data in the assertion time register 17 (t11). In the example shown in FIG. 2, a value of '19' is set as the assertion time data, representing nineteen system clock cycles. If the value '19' is set in the assertion time register 17 as in this example, an external reset signal with an assertion time of twenty cycles is obtained as described later. The value set in the assertion time register 17 is selected so as to give the external reset signal (RT) an assertion time adequate to reset the external peripheral devices 2a, 2b, 2c.

If a program runaway occurs while the microcomputer 1 is operating, the overflow reset signal (VF) is activated (t20). The overflow reset signal (VF) has a duration of several system clock cycles (six cycles in this example). The overflow reset signal (VF) propagates through the first logical OR gate 14 to activate the internal reset signal (RQ) that resets the CPU 6 and internal circuitry 8. The overflow reset signal (VF) also propagates through the external reset signal generator 11 to activate the external reset signal (RT), which propagates through the second logical OR gate 15 to activate the reset output (RO) signal, which is supplied to the external peripheral devices 2a, 2b, 2c to reset them.

Resetting of the external peripheral devices 2a, 2b, 2c therefore begins at the same time as the resetting of the internal circuits of the microcomputer 1, instead of beginning after the microcomputer comes out of the reset state. The reset initiated by the overflow reset signal (VF) does not reset the assertion time counter 16, however, so one clock cycle after the external reset (RT) signal output by the set-reset flip-flop 19 becomes active (logical '1'), the assertion time counter 16 starts counting the system clock (CK).

When the count value (CV) in the assertion time counter 16 matches the data '19' set in the assertion time register 17, the equality signal (EQ) goes from the logical '0' or inactive level to the logical '1' or active level and resets the set-reset flip-flop 19. The output (RT) of the set-reset flip-flop 19 then goes from the logical '1' or active level to the logical '0' or inactive level, so the assertion time counter 16 stops counting and the count value (CV) is reset.

As a result of this operation, the external reset signal (RT) remains asserted for a duration of twenty clock cycles, corresponding to (though one greater than) the assertion time '19' set in the assertion time register 17.

The output (RT) of the set-reset flip-flop 19 is supplied through the second logical OR gate 15 to the external peripheral devices 2a, 2b, 2c to reset them. Since the value set in the assertion time register 17 is determined as described above, the reset output (RO) signal has a sufficient assertion time to reset the external peripheral devices 2a, 2b, 2c.

The length of time required to reset the internal logic circuits in a microcomputer is generally only several cycles of the microcomputer's system clock (CK), and this is less than the length of time required to reset the external peripheral devices 2a, 2b, 2c. In the microcomputer of the present embodiment, when a program runaway triggers the overflow reset signal (VF), the internal reset signal (RQ) has a fixed assertion time equal to six system clock cycles, and the reset output (RO) signal has a selectable assertion time that will generally be set to more than six system clock cycles. As a result, when the internal rest signal (RQ) is negated after six system clock cycles, the CPU 6 can begin the process of restarting the microcomputer 1 without waiting for the reset output (RO) signal to be negated.

The microcomputer 1 cannot access the external peripheral devices 2a, 2b, 2c during the period while the reset output (RO) signal is active. During this period, however, the microcomputer 1 typically is busy with internal processes such as initializing the internal circuitry 8, and does not need to access the external peripheral devices 2a, 2b, 2c. Therefore, giving the internal reset signal (RQ) a shorter assertion time than the reset output (RO) signal does not cause problems.

The circuits needed to generate the reset output (RO) signal, including the assertion time counter 16, assertion time register 17, comparator 18, and set-reset flip-flop 19, are configured so as not to be cleared or reset by the overflow reset signal (VF) and the internal reset signal (RQ) generated on the basis of this signal.

In the above microcomputer, when a runaway occurs and the watchdog timer-counter 9 generates an overflow reset signal (VF), the external peripheral devices are reset immediately, without having to wait for the microcomputer to be reset first. The entire resetting process is therefore completed faster than in conventional systems in which the peripheral devices are reset by the CPU's control program after the microcomputer emerges from its own reset. This also applies to the power-on reset process in which the microcomputer and peripheral devices are reset simultaneously by the reset input (RI) signal, but when the reset is due to the overflow reset signal (VF), the saving of time is particularly great, because the microcomputer can resume operation while the peripheral devices are still being reset.

This is a consequence of the capability to select an assertion time for the external reset signal (RT) that differs from the assertion time of the internal reset signal (RQ), so that both reset signals can have the optimum assertion times for their respective purposes.

Since the value (SV) describing the assertion time of the reset output signal is written into the assertion time register 17 by the CPU 6, it can be easily changed by changing a parameter defined in the microcomputer's control program.

Since the internal circuits of the microcomputer are reset by the output of the first logical OR gate 14 both when the reset signal (RI) is externally supplied and when the overflow reset signal (VF) is generated within the microcomputer, the system configuration of the microcomputer can be simplified.

Similarly, since the external peripheral devices 2a, 2b, 2c are reset by the output of the second logical OR gate 15 both when the reset signal (RI) is externally supplied and when the overflow reset signal (VF) is generated within the microcomputer, the system configuration of the external peripheral devices can be simplified.

If the reset input (RI) signal generated outside the microcomputer 1 and the reset signal (RT) generated internally from the overflow reset signal (VF) were to be supplied separately to the external peripheral devices 2a, 2b, 2c, each external peripheral device would need to have separate terminals to receive the two reset signals (RT, RI). In the first embodiment, since the external peripheral devices receive both types of reset signals through the second logical OR gate 15, they require only one reset input terminal each.

Notwithstanding this advantage, however, the second logical OR gate 15 may be omitted and the externally generated reset input (RI) signal and the internally generated external reset (RT) signal may be sent separately to the external peripheral devices 2a, 2b, 2c. In this case, the internally generated external reset signal (RT) is supplied to the external peripheral devices through the second logical OR gate 15, but the externally supplied reset input (RI) signal may be supplied to the external peripheral devices directly, without passing through the microcomputer 1.

Similarly, the first logical OR gate 14 may be omitted and the overflow reset signal (VF) may be supplied directly to the CPU 6 and internal circuitry 8. In this case, the externally supplied reset input (RI) signal is supplied separately to the CPU 6 and internal circuitry 8.

None of these variations change the basic effect of the external reset signal generator 11 in the first embodiment, which is that when the overflow reset signal (VF) is generated, the resulting internal and external reset signals may have different durations, the duration of the external reset signal being selectable in advance by the CPU 6.

Second Embodiment

In the first embodiment, the reset input (RI) signal supplied through the reset input terminal 21 propagates directly (without changing its assertion time) through the second logical OR gate 15 to activate the reset output (RO) signal. Therefore, the reset input (RI) signal must be asserted for an interval long enough to reset the external peripheral devices. Generating a reset signal having a sufficient assertion time often requires the connection of an extra circuit to the reset input terminal 21, which adds to the size and complexity of the system including the microcomputer.

Figure 3:
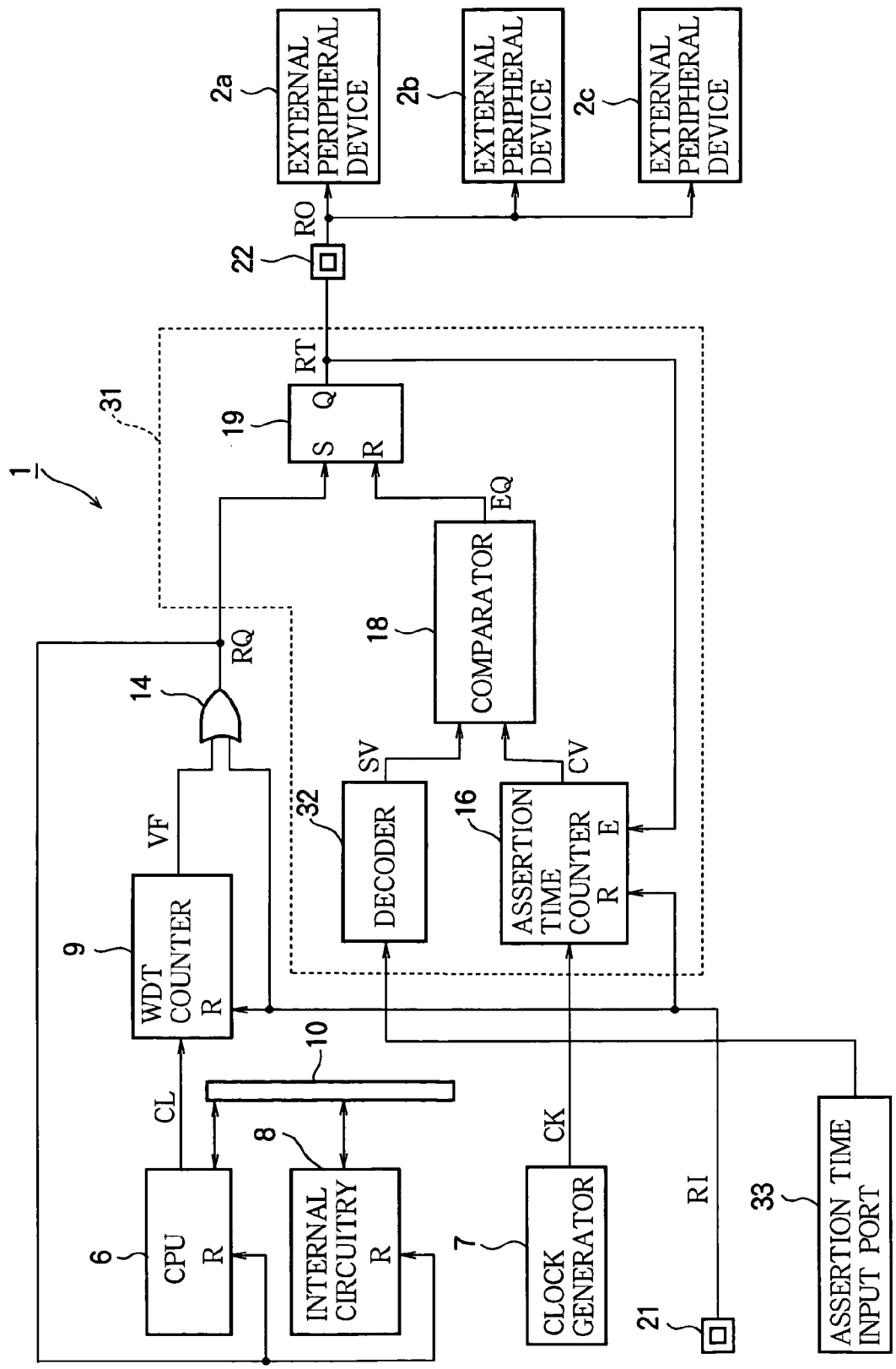
FIG. 3 is a schematic block diagram showing a microcomputer with external peripheral devices according to a second embodiment of the invention.

The microcomputer of the second embodiment solves this problem with the circuit configuration shown in FIG. 3.

The microcomputer shown in FIG. 3 is basically similar to the microcomputer shown in FIG. 1, but with the following differences. First, the structure of the external reset signal generator 31 is changed. Instead of receiving the overflow reset signal (VF) and outputting the external reset signal (RT) to an OR gate 15 as did the external reset signal generator 11 in FIG. 1, the external reset signal generator 31 receives the internal reset signal (RQ) from first logical OR gate 14 and outputs the external reset signal (RT) directly to the reset output terminal 22 as the reset output (RO) signal. The external reset signal generator 31 also has a decoder 32 in place of the assertion time register 17 in FIG. 1. Instead of being connected to the internal bus 10, the decoder 32 receives a signal from an assertion time input port 33.

The assertion time input port 33 is connected to, for example, a logic switch that holds and outputs a manually selectable one of a predetermined number of numeric values. The assertion time input port 33 decodes this numeric value to generate the internal value (SV) of the desired assertion time, which is supplied to the comparator 18.

In the second embodiment, the reset input signal (RI) propagates through the logical OR gate 14 to the external reset signal generator 31, where its assertion time is changed or extended, and is then supplied to the external peripheral devices 2*a*, 2*b*, 2*c*.

The reason for using the decoder 32 and assertion time input port 33 in the second embodiment is as follows. When the reset input (RI) signal is asserted at power-on, setting the output of the set-reset flip-flop 19 to the logical '1' or active level and activating the assertion time counter 16, the comparator 18 must be able to compare the resulting count value (CV) with value (SV) representing the desired assertion time of the reset output signal (RO). In the configuration shown in FIG. 3, this is possible because as soon as power is turned on, the decoder 32 receives and decodes the input received at the assertion time input port 33 and begins output of the decoded value (SV). If the assertion time register 17 in FIG. 1 were to be used instead of the decoder 32, it would not in general output the correct SV value immediately, because when the assertion time counter 16 starts counting, the CPU 6 has just emerged from the reset state and may not yet have written the correct data in the assertion time register 17. Use of the decoder 32 and assertion time input port 33 instead of the assertion time register 17 in the second embodiment enables the comparator 18 to receive the correct SV data even when the CPU 6 has just begun operating.

The assertion time input port 33 comprises, for example, three input terminals connected to respective binary switches, each of which has two states (on and off), providing a total of eight ($2^3$) input values, so that one of eight assertion times can be selected.

An example of the eight assertion times (numbers of system clock cycles) selected according to the binary switch states is shown in FIG. 4. The on and off states of the switches are indicated by the numbers '1' and '0', respectively. The value (SV) output by the decoder 32 is one less than the value describing the desired assertion time, for the reason explained in the first embodiment.

The operation of the microcomputer in FIG. 3 will now be described with reference to FIG. 5.

When the system is powered on, the reset input (RI) signal input to the reset input terminal 21 of the microcomputer 1 rises (t31). This reset input (RI) signal propagates through the logical OR gate 14 to activate the internal reset signal (RQ) and reset the CPU 6 and internal circuitry 8 in the microcomputer 1. The output (RQ) of the OR gate 14 is also supplied to the external reset signal generator 31 and sets the set-reset flip-flop 19. The output (RT) of the set-reset flip-flop 19 goes to the logical '1' or active level and is supplied directly to the external peripheral device 2*a*, 2*b*, 2*c* as the reset output (RO) signal. The output (RT) of the set-reset flip-flop 19 is also supplied to the assertion time counter 16 as the count enable signal, causing the assertion time counter 16 to start counting the system clock (CK). The comparator 18 compares the count value (CV) output by the assertion time counter 16 with the decoded value (SV) output by the decoder 32. The decoder 32 outputs the desired decoded value (SV), set by the input at the assertion time input port 33, even while the CPU 6 is still in the reset state.

When the count value (CV) output by the assertion time counter 16 matches the decoded value (SV), the set-reset flip-flop 19 is reset, and its output goes to the logical '0' or inactive level (t32). As a result, the reset output (RO) signal is negated and the external peripheral devices 2*a*, 2*b*, 2*c* begin normal operation. The assertion time counter 16 also stops counting and the count value (CV) is reset to zero.

Similarly, when the overflow reset signal (VF) is generated (t41), it propagates through the OR gate 14 to activate the internal reset signal (RQ) and reset the CPU 6 and internal circuitry 8 in the microcomputer 1. At the same time, the output (RQ) of the OR gate 14 is supplied to the external reset signal generator 31. The external reset signal generator 31 operates in the manner described above (when the reset input (RI) signal is externally supplied through the OR gate 14 to the external reset signal generator 31) and continues to assert the reset output (RO) signal until the count value (CV) output by the assertion time counter 16 matches the decoded value (SV) (t42).

In the second embodiment, the external peripheral devices are reliably reset both when the power supply is turned on and the reset input (RI) signal is externally supplied, and when a runaway occurs and the watchdog timer-counter 9 generates an overflow reset signal (VF). In both cases, the assertion time of the external reset signal (RT) may differ from the assertion time of the internal reset signal (RQ), so the external peripheral devices can receive a reset signal that is asserted for a sufficient length of time without delaying the initial processing in the microcomputer after the reset.

The assertion time for the external reset signal can be easily changed by changing the states of the inputs at the assertion time input port 33.

Since the internal circuits of the microcomputer are reset by the output of the logical OR gate 14 both when the reset signal (RI) is externally supplied and when the overflow reset signal (VF) is generated within the microcomputer, the system configuration of the microcomputer is simplified.

Similarly, since the external peripheral devices 2a, 2b, 2c are reset by the external reset signal (RT) generated on the basis of the output of the logical OR gate 14 both when the reset signal (RI) is externally supplied and when the overflow reset signal (VF) is generated within the microcomputer, the system configuration of external peripheral devices can be simplified, as in the first embodiment.

Notwithstanding this advantage, however, the OR gate 14 may be omitted and the overflow reset signal (VF) may be sent directly to the external reset signal generator 31. In this case, the externally supplied reset input (RI) signal may be supplied separately to the external reset signal generator 31.

Similarly, the overflow reset signal (VF) may be supplied directly to the CPU 6 and internal circuitry 8 without using the OR gate 14. In this case, the externally supplied reset input (RI) signal is supplied separately to the CPU 6 and internal circuitry 8.

None of these variations change the basic effect of the external reset signal generator 31 in the second embodiment, which is that when the overflow reset signal (VF) is generated, the resulting internal and external reset signals may have different durations, the duration of the external reset signal being selectable in advance by input at the assertion time input port 33.

Figure 5:
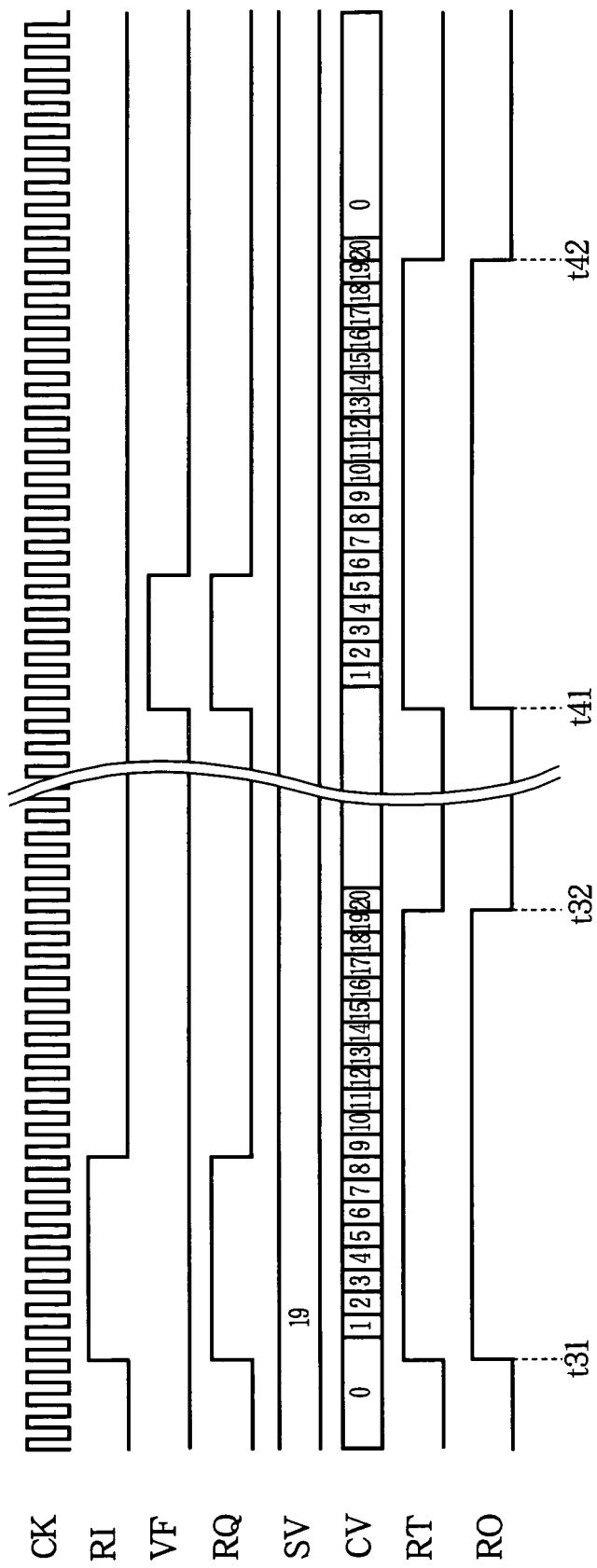
FIG. 5 is a timing waveform diagram illustrating the resetting of the microcomputer in the second embodiment.

In a variation of the reset sequence shown in FIG. 5, at power-on, the reset input (RI) signal is asserted before output of the system clock (CK) from the clock generator 7 begins, and negated after the clock output is stabilized. The assertion time counter 16 starts counting when the reset input signal is negated. The reset output (RO) signal is asserted when the reset input (RI) signal is asserted, and continues to be asserted after the reset input signal is negated, until the count (CV) output by the assertion time counter 16 matches the value (SV) output by the decoder.

Third Embodiment

In the first and second embodiments, the three external peripheral devices 2a, 2b, 2c receive the same reset output (RO) signal, which must accordingly be asserted for an interval long enough to satisfy the requirements of the external peripheral device that requires the longest reset time. In the third embodiment, shown in FIG. 6, each external peripheral device 2a, 2b, 2c receives a separate reset output signal, which can be optimized to the requirements of the particular external peripheral device.

Figure 6:
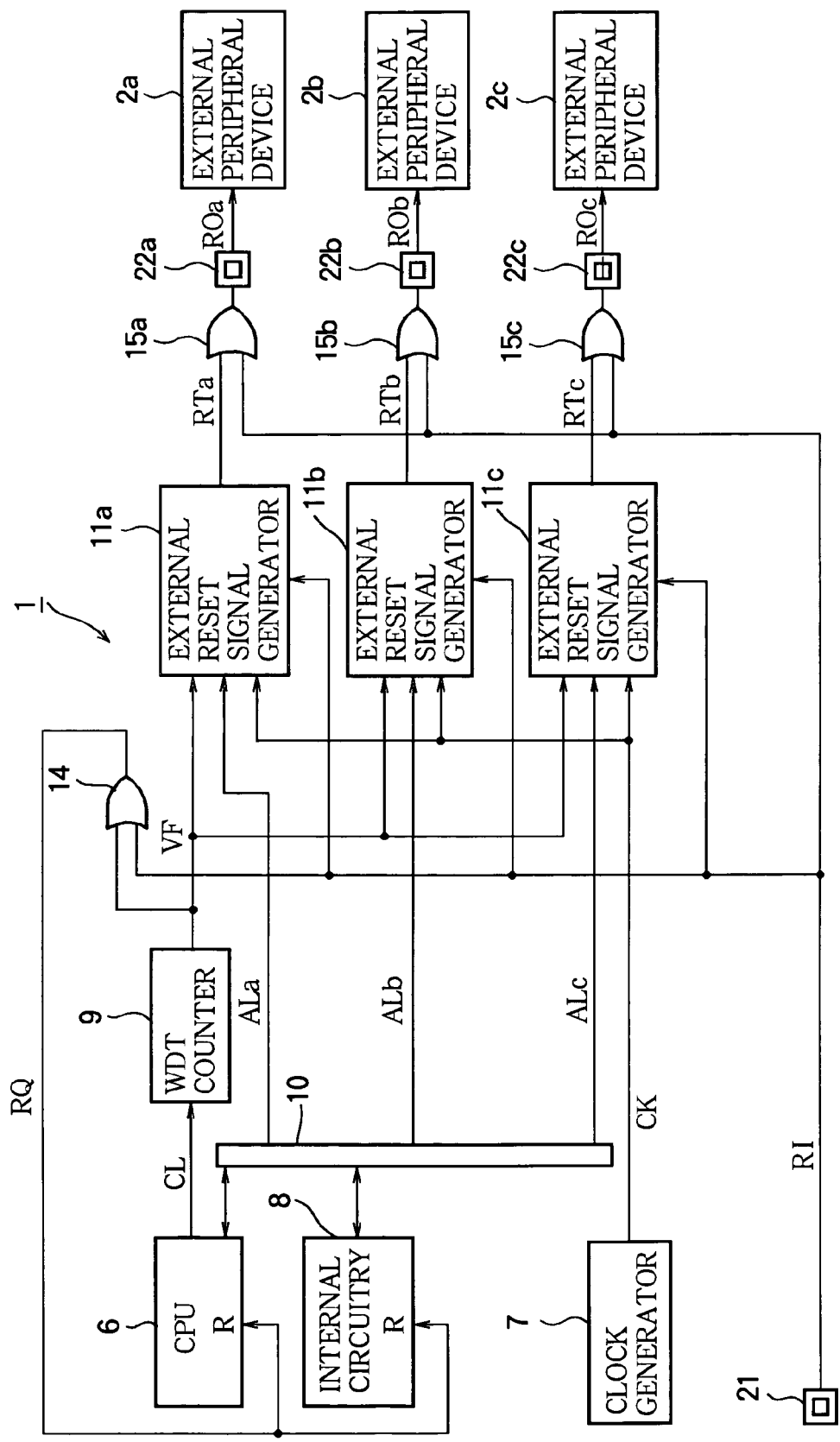
FIG. 6 is a schematic block diagram showing a microcomputer with external peripheral devices according to a third embodiment.

Each of three external reset signal generators 11a, 11b, 11c in FIG. 6 has the same internal structure as the external reset signal generator 11 shown in FIG. 1. The values set in the assertion time setting registers in the external reset signal generators 11a, 11b, 11c (corresponding to the assertion time register 17 in FIG. 1) may differ from each other. Logical OR gates 15a, 15b, 15c perform separate logical OR operations on the output signals (RTa, RTb, RTc) of the external reset signal generators 11a, 11b, 11c and the externally supplied reset input (RI) signal, thereby generating reset output signals (ROa, ROb, ROc), which are supplied through separate reset output terminals 22a, 22b, 22c to the external peripheral devices 2a, 2b, 2c.

In the third embodiment, the CPU 6 can set the optimum assertion length (ALa, ALb, ALc) for each of the three reset output signals (ROa, ROb, ROc). If one of the external peripheral devices 2a, 2b, 2c requires a particularly long reset time, the CPU 6 can set the necessary assertion time for its reset output signal without having to similarly lengthen the assertion times of the other reset output signals. This feature can speed up the setting of initial data in the external peripheral devices, because the CPU 6 can proceed with the initialization of one external peripheral device while another external peripheral device is still being reset.

The third embodiment has been described as a modification of the first embodiment (FIG. 1), but similar modifications can also be made in the second embodiment (FIG. 3).

Figure 2:
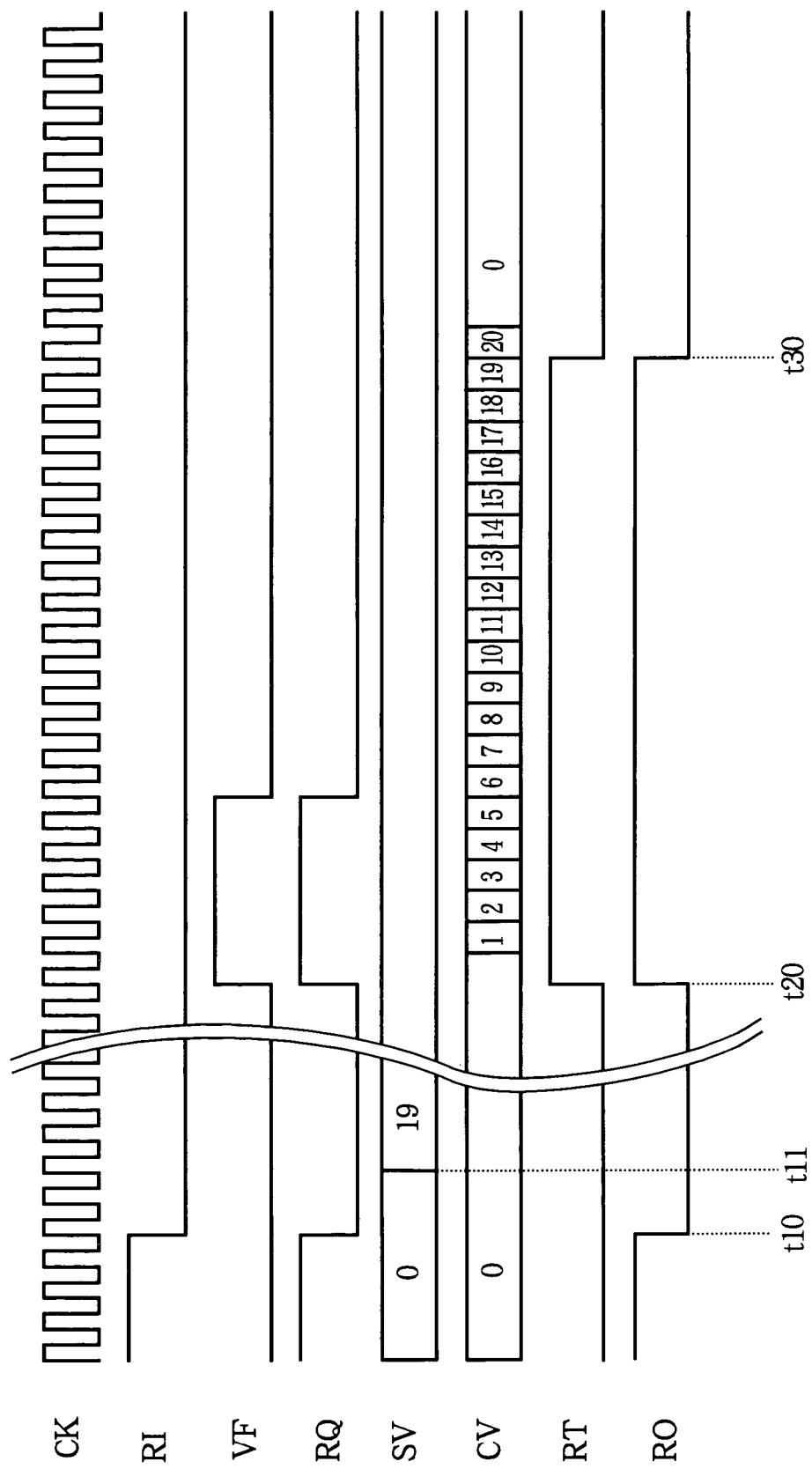
FIG. 2 is a timing waveform diagram illustrating the resetting of the microcomputer in the first embodiment.

In FIGS. 2 and 5, the assertion time of the reset output signal (RO) is longer than the assertion time of the internal reset signal (RQ), and in FIG. 5 the assertion time of the reset output signal (RO) is also longer than the assertion time of the reset input signal (RI), but the assertion time of the reset output signal may be shorter than the assertion time of the internal reset signal in the first embodiment, and shorter than the assertion times of the internal reset signal and reset input signal in the second embodiment. This feature can be used to assure that when the CPU 6 comes out of the reset state, the external peripheral devices have already been reset.

Those skilled in the art will recognize that further variations are possible within the scope of the invention, which is defined in the appended claims.

What is claimed is:

1. A microcomputer comprising:
   a central processing unit (CPU) that, when operating normally, repeatedly generates a clear signal;
   a watchdog timer-counter that receives the clear signal from the CPU and, if no clear signal is received for a predetermined length of time, asserts an overflow reset signal for a first interval, thereby resetting the CPU;
   a register in which a length of time of a second interval longer than the first interval is stored;
   a counter that receives a clock, begins counting the clock when an external reset signal is asserted, thereby generating an interval count;
   a comparator that compares the interval count with the length of time of the second interval, and generates an equality signal when the interval count matches the length of time of the second interval;
   a set-reset flip-flop that receives the overflow reset signal as one input and the equality signal as another input and generates an external reset signal for asserting an external peripheral device controlled by the CPU, the external reset signal being supplied to the counter; and
   a reset output terminal for external output of the external reset signal;
   wherein the set-reset flip-flop asserts the external reset signal when the overflow reset signal output from the watchdog timer-counter is input, and ceases to assert the external reset signal when the equality signal is input.

2. The microcomputer of claim 1, further comprising:
   a reset input terminal receiving an externally generated reset signal; and
   a first logic circuit for performing a first logic operation on the overflow reset signal and the externally generated reset signal, thereby generating a first logic signal, the CPU being reset by the first logic signal.

3. The microcomputer of claim 2, wherein the first logic operation asserts the first logic signal whenever at least one of the overflow reset signal and the externally generated reset signal is asserted.

4. The microcomputer of claim 2, wherein the first logic operation is a logical OR operation.

5. The microcomputer of claim 2, further comprising a second logic circuit for performing a second logic operation on the external reset signal and the externally generated reset signal, thereby generating a second logic signal, the second logic signal being supplied to the reset output terminal.

6. The microcomputer of claim 5, wherein the second logic operation asserts the second logic signal whenever at least one of the external reset signal and the externally generated reset signal is asserted.

7. The microcomputer of claim 5, wherein the second logic operation is a logical OR operation.

8. The microcomputer of claim 1, further comprising:
- a reset input terminal receiving an externally generated reset signal; and
- a logic circuit for performing a logic operation on the overflow reset signal and the externally generated reset signal, thereby generating a reset logic signal, the CPU being reset by the reset logic signal, the reset logic signal also being supplied to the external reset signal generator.

9. The microcomputer of claim 8, wherein the logic operation asserts the reset logic signal whenever at least one of the overflow reset signal and the externally generated reset signal is asserted.

10. The microcomputer of claim 8, wherein the logic operation is a logical OR operation.

11. The microcomputer of claim 1, wherein the register is settable by the CPU.

12. The microcomputer of claim 1, having a plurality of external reset signal generators for output of external reset signals of different durations to different external peripheral devices.

* * * * *